(12) United States Patent
Dally et al.

(10) Patent No.: US 9,928,104 B2
(45) Date of Patent: Mar. 27, 2018

(54) SYSTEM, METHOD, AND COMPUTER PROGRAM PRODUCT FOR A TWO-PHASE QUEUE

(71) Applicant: NVIDIA Corporation, Santa Clara, CA (US)

(72) Inventors: William J. Dally, Los Altos Hills, CA (US); James David Balfour, Mountain View, CA (US); Ignacio Llamas Ubieto, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 869 days.

(21) Appl. No.: 13/922,189

(22) Filed: Jun. 19, 2013

(65) Prior Publication Data
US 2014/0380002 A1    Dec. 25, 2014

(51) Int. Cl.
*G06F 5/00*        (2006.01)
*G06F 9/46*        (2006.01)

(52) U.S. Cl.
CPC .................................. *G06F 9/466* (2013.01)

(58) Field of Classification Search
None
See application file for complete search history.

(56) References Cited

U.S. PATENT DOCUMENTS

| | | | | |
|---|---|---|---|---|
| 6,457,021 | B1* | 9/2002 | Berkowitz | ........ G06F 17/30371 |
| 6,792,518 | B2* | 9/2004 | Armangau | .......... G06F 11/1469 |
| | | | | 707/999.202 |
| 8,411,096 | B1* | 4/2013 | Mahan | .................. G06F 9/3881 |
| | | | | 345/522 |
| 2006/0294333 | A1* | 12/2006 | Michaylov | .............. G06F 9/466 |
| | | | | 711/168 |
| 2014/0169189 | A1* | 6/2014 | Kalkunte | ............ H04L 43/0882 |
| | | | | 370/252 |

\* cited by examiner

*Primary Examiner* — Hyun Nam
*Assistant Examiner* — Juanito Borromeo
(74) *Attorney, Agent, or Firm* — Zilka-Kotab, PC

(57) ABSTRACT

A system, method, and computer program product are provided for accessing a queue. The method includes receiving a first request to reserve a data record entry in a queue, updating a queue state block based on the first request, and returning a response to the request. A second request is received to commit the data record entry and the queue state block is updated based on the second request.

21 Claims, 9 Drawing Sheets

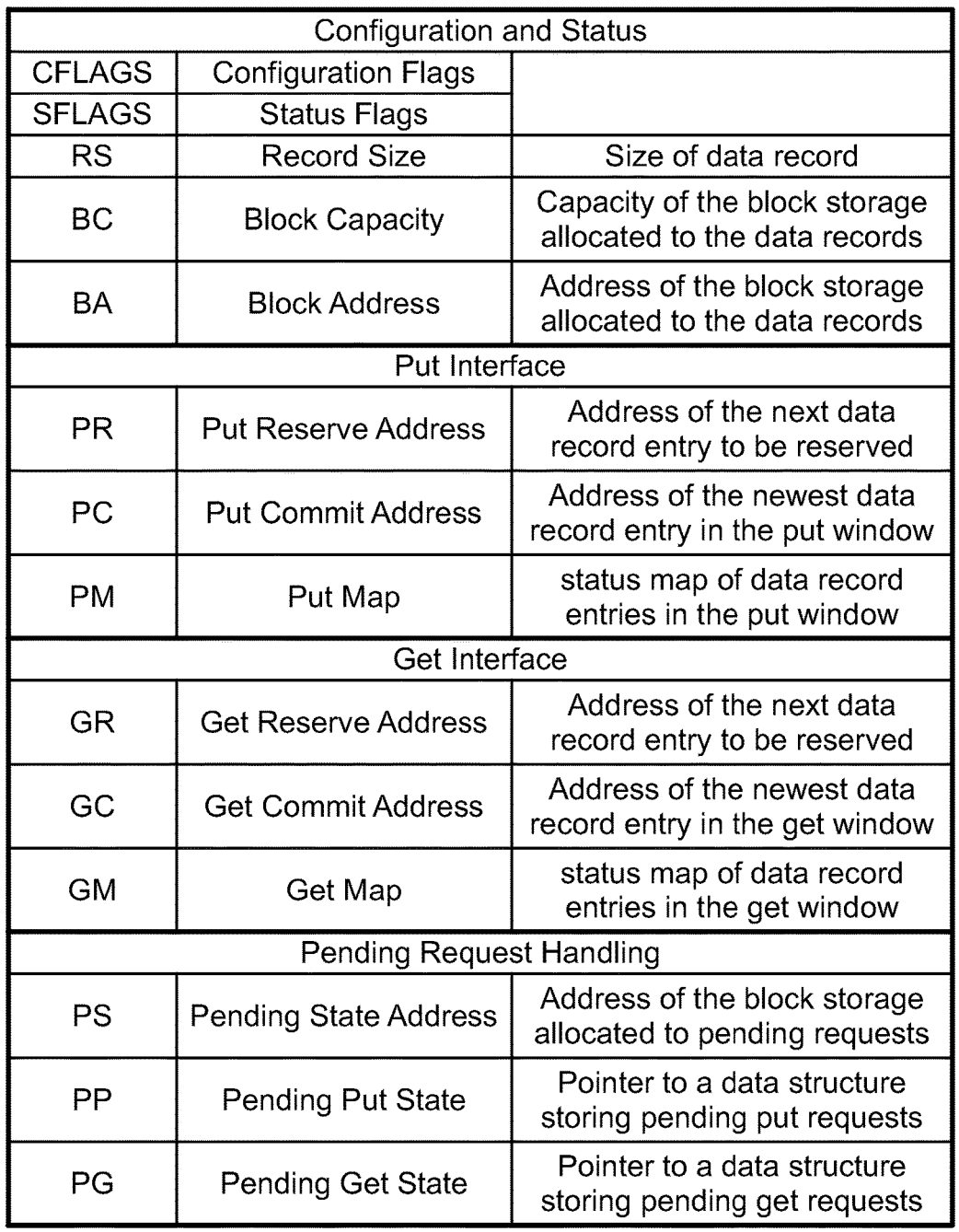

| Configuration and Status | | |
|---|---|---|
| CFLAGS | Configuration Flags | |
| SFLAGS | Status Flags | |
| RS | Record Size | Size of data record |
| BC | Block Capacity | Capacity of the block storage allocated to the data records |
| BA | Block Address | Address of the block storage allocated to the data records |
| Put Interface | | |
| PR | Put Reserve Address | Address of the next data record entry to be reserved |
| PC | Put Commit Address | Address of the newest data record entry in the put window |
| PM | Put Map | status map of data record entries in the put window |
| Get Interface | | |
| GR | Get Reserve Address | Address of the next data record entry to be reserved |
| GC | Get Commit Address | Address of the newest data record entry in the get window |
| GM | Get Map | status map of data record entries in the get window |
| Pending Request Handling | | |
| PS | Pending State Address | Address of the block storage allocated to pending requests |
| PP | Pending Put State | Pointer to a data structure storing pending put requests |
| PG | Pending Get State | Pointer to a data structure storing pending get requests |

*Fig. 3A*

SYSTEM, METHOD, AND COMPUTER PROGRAM PRODUCT FOR A TWO-PHASE QUEUE

This invention was made with Government support under LLNS subcontract B599861 awarded by DOE. The Government has certain rights in this invention.

FIELD OF THE INVENTION

The present invention relates to a data interface, and more particularly to a hardware queue.

BACKGROUND

Conventional hardware queuing techniques rely on a first-in first-out (FIFO) buffer to pass data output by a first processing unit as an input to a second processing unit. A FIFO buffer decouples the two processing units so that the second processing unit does not need to consume the data as the data is produced by the first processing unit. However, the size of the FIFO buffer is fixed and may fill requiring the first processing unit to stall and wait until the second processing unit begins draining the FIFO buffer. Processing throughput is reduced when the FIFO buffer is full and the first processing unit is stalled. Also, the data is removed from the FIFO buffer by the second processing unit in the same order in which the data was stored into the FIFO buffer by the first processing unit. For some systems, greater flexibility in terms of inserting and removing data from the FIFO buffer may be desired.

Thus, there is a need for addressing the issue of passing data between different processing units and/or other issues associated with the prior art.

SUMMARY

A system, method, and computer program product are provided for accessing a queue. The method includes receiving a first request to reserve a data record entry in a queue, updating a queue state block based on the first request, and returning a response to the request. A second request is received to commit the data record entry to the queue and the queue state block is updated based on the second request.

BRIEF DESCRIPTION OF THE DRAWINGS

FIG. 3A illustrates a table of the contents of a queue state block, in accordance with one embodiment;

DETAILED DESCRIPTION

Data may be passed between different processing units using a queue having a two-phase interface protocol. Whereas, a conventional queue or FIFO buffer is implemented using a single operation to store and another operation to remove data from the queue, respectively, a two-phase queue may be accessed using a reserve-commit protocol employing two separate operations to store and two separate operations to remove data from the two-phase queue. In the context of the present description, locations in memory allocated for storing entries transmitted asynchronously between two processing units may be referred to herein as a queue. The queue may be implemented in a dedicated memory such as a static random access memory (SRAM) or allocated from a larger general shared memory. The size of the queue may be static or dynamic and may be configured during a boot sequence or dynamically during the processing of data by the two processing units. A two-phase queue may be configured to operate as a queue.

In the context of the present description, a data record entry in the two-phase queue is reserved separately from a store operation that writes data to the data record entry. First, a producer reserves a data record entry in the two-phase queue and then, when the data is written to the data record entry by the producer, the data record entry is committed by the producer, so that a consumer may then read the data from the data record entry. A two-phase operation is also performed to remove the data from the data record entry. First, the data record entry is reserved by a consumer and then, when the consumer finishes reading the data, the data record entry that was reserved is committed, so that the data record entry may be reused. In addition to decoupling the producer from the consumer, the two-phase queue also decouples the writing and/or reading of the data from a request to reserve a data record entry where the data will be or is stored. Additionally, the number of data record entries in the two-phase queue may be adjusted to accommodate mismatches over time in the rates at which a producer stores data and a consumer removes the data. In contrast with a conventional FIFO buffer, data can be written into and/or read from the two-phase queue out-of-order.

Figure 1:
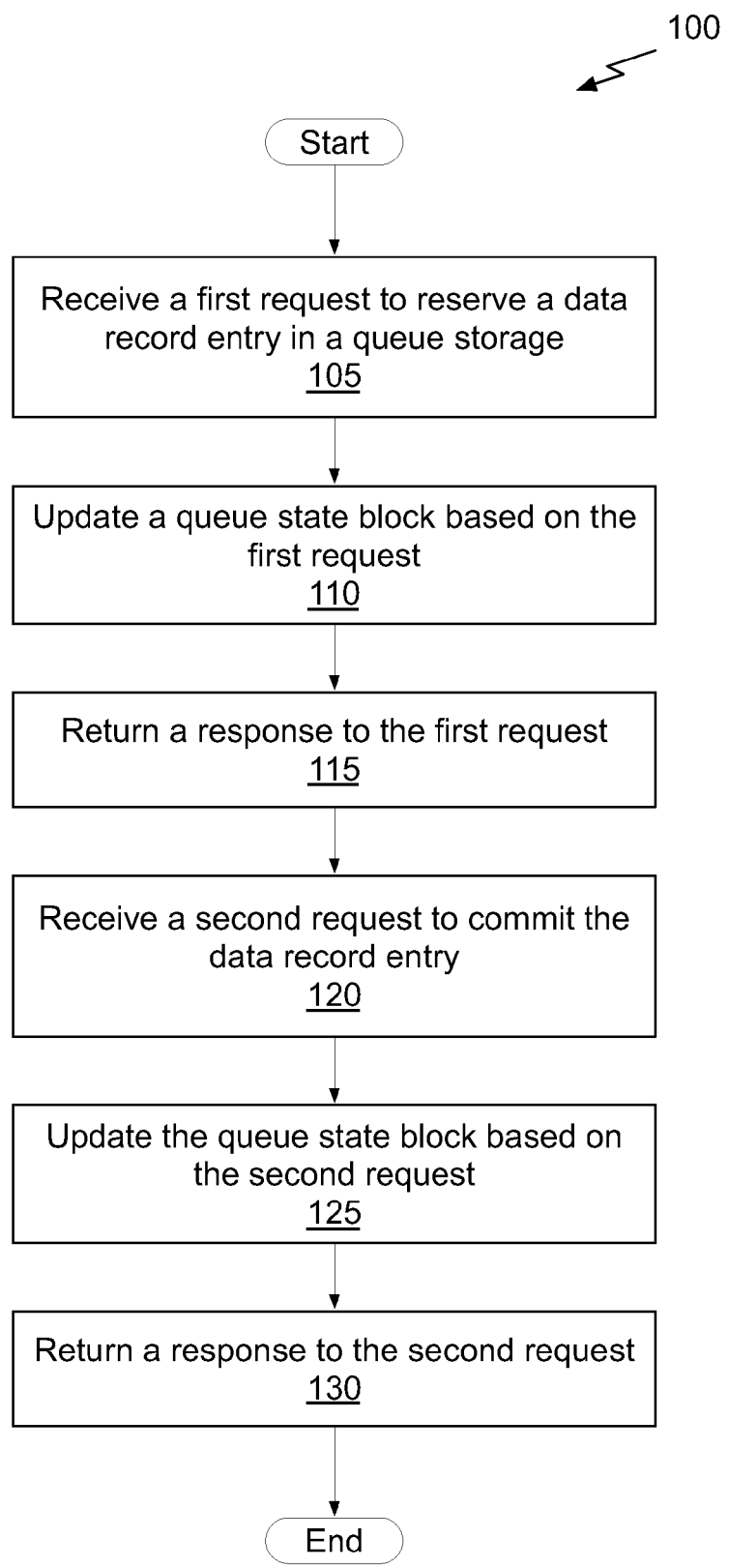
FIG. 1 illustrates a flowchart of a method for accessing a queue, in accordance with one embodiment.

FIG. 1 illustrates a flowchart of a method 100 for accessing a two-phase queue, in accordance with one embodiment. At operation 105, a first request to reserve a data record entry in a queue is received. At operation 110, a queue state block is updated based on the first request. At operation 115, a response to the first request is returned. At operation 120, a second request to commit the data record entry is received. At operation 125, the queue state block is updated based on the second request. At operation 130, a response to the second request is returned.

The first and second requests may be generated by a producer of data to be stored in the data record entry or by a consumer of data to be read from the data record entry. In one embodiment, the data record entry stores the data. In another embodiment, the data record entry stores a pointer to a portion of memory where the data is stored. When a data record entry is reserved by a producer or consumer in response to the first request, the data associated with the data record entry may be written or read over one or more clock cycles before the corresponding second request is received by the queue. In the context of the present description, the queue state block maintains the state of data record entries of the queue. For example, the queue state block indicates which data record entries are reserved and committed, reserved and uncommitted, and are neither reserved nor committed, as described further herein.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
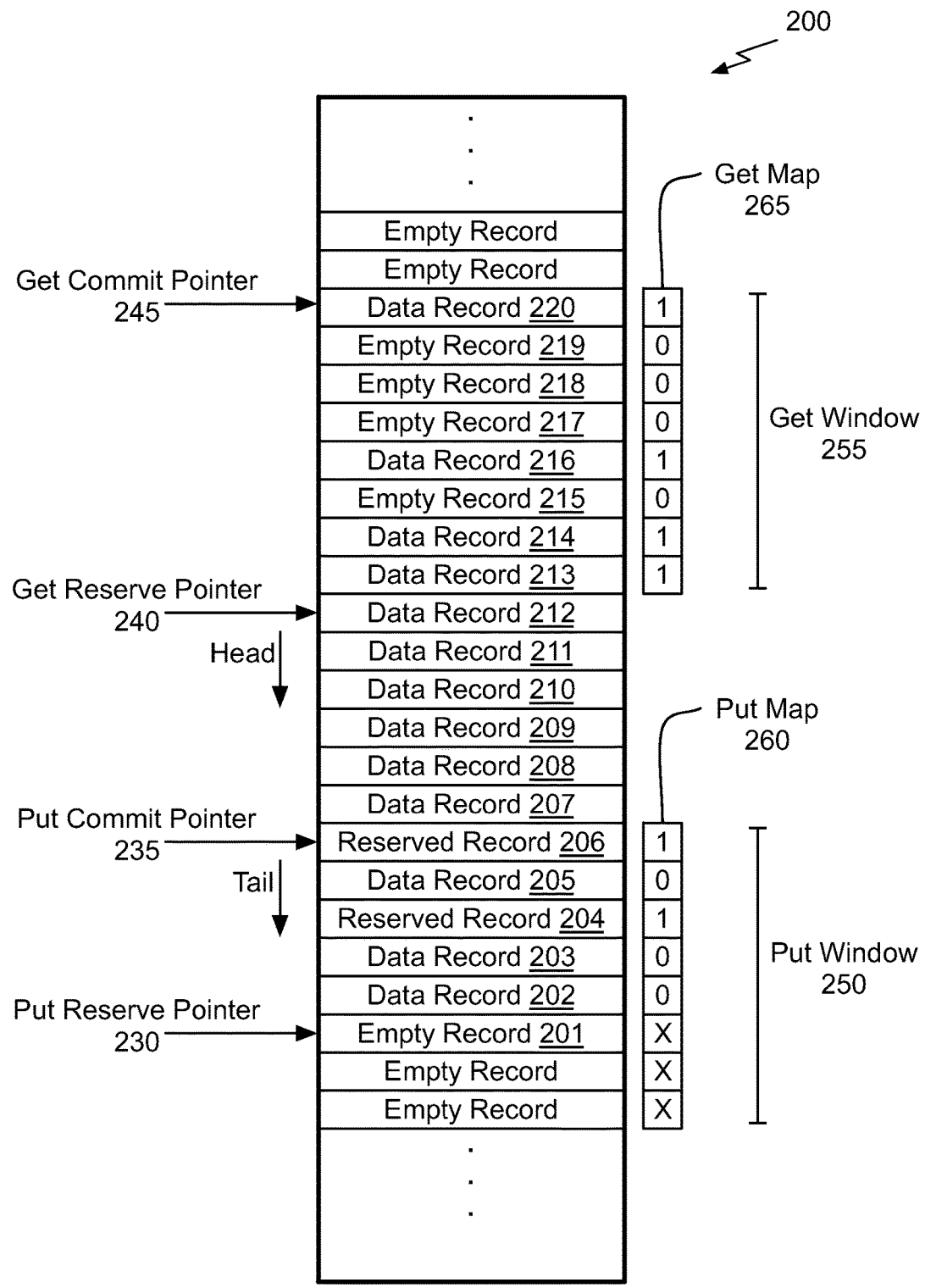
FIG. 2 illustrates a conceptual diagram of a queue, in accordance with one embodiment.

FIG. 2 illustrates a conceptual diagram of a two-phase queue 200, in accordance with one embodiment. A set of put pointers including a put reserve pointer 230 and a put commit pointer 235 are used to reserve and commit data record entries when storing data into a tail of the two-phase queue 200. A set of get pointers including a get reserve pointer 240 and a get commit pointer 245 are used to reserve and commit data record entries when reading data from a head of the two-phase queue 200. As shown in FIG. 2, a data record entry may be empty (e.g., empty record), may store data (e.g., data record), or may be reserved for storing data (e.g., reserved record).

In one embodiment, the two-phase queue 200 operates as a circular buffer including a number of data record entries that may be empty, may store data, or may be reserved to store data. When the two-phase queue 200 is implemented as a circular buffer, each of the pointers (the put reserve pointer 230, the put commit pointer 235, the get reserve pointer 240, and the get commit pointer 245) may advance in the direction indicated by the head and tail arrows at the get reserve pointer 240 and the put commit pointer 235, respectively. However, the put reserve pointer 230 should not overcome the get commit pointer 245 when the two-phase queue 200 fills. In other words, the put reserve pointer 230 may equal the get commit pointer 245, but the put reserve pointer 230 should not advance past the get commit pointer 245. Similarly, the get reserve pointer 240 should not overcome the put commit pointer 235 when the two-phase queue 200 empties.

The put reserve pointer 230 points to the first data record entry that can be reserved, specifically, an empty record 201. Data record entries beyond the put reserve pointer 230 up to the get commit pointer 245 are empty data record entries that are not reserved. The put commit pointer 235 points to the oldest uncommitted data record entry that is reserved to be written at the tail of the two-phase queue 200. As shown in FIG. 2, the put commit pointer 235 points to the reserved data record entry 206. Data record entries 202, 203, 204, 205, and 206 between the put reserve pointer 230 (exclusive) and the put commit pointer 235 (inclusive) have all been reserved, but not necessarily committed. When the put commit pointer 235 and the put reserve pointer 230 point to the same data record entry in the two-phase queue 200 all of the reserved data record entries that are reserved to store data are also committed.

A put window 250 is defined by the put commit pointer 235 and a put map 260. The put map 260 includes a predetermined number of bits, where each bit corresponds to one data record entry. As shown in FIG. 2, the put map 260 is 8 bits and is therefore configured to represent the reserved/committed state of up to 8 data record entries. In other embodiments, the put map 260 may include fewer or more bits. The put map 260 indicates the status of the data record entries starting at the put commit pointer 235. For data record entries up to the put reserve pointer 230, each bit of the put map 260 indicates whether the corresponding data record entry is committed or not. When each data record entry is reserved by one or more producers in-order, all of the data record entries between the put commit pointer 235 (inclusive) and the put reserve pointer 230 (exclusive) are reserved.

Bits of the put map 260 corresponding to data record entries at and beyond the put reserve pointer 230 (the empty data record entry 201) are shown as don't cares (X's) because those data record entries are not yet reserved. The bits of the put map 260 that correspond to the data record entries 202, 203, and 205 that are committed and store data are set to zero. The bits of the put map 260 that correspond to the data record entries 204 and 206 that are reserved and not yet committed, such that the data record entries 204 and 206 do not yet store valid data, are set to one. In another embodiment, bits of the put map 260 for the data record entries that are committed are set to one and bits of the put map 260 for the data record entries that are not yet committed are set to zero.

The data record entries between the put commit pointer 235 (exclusive) and the get reserve pointer 240 (inclusive) (e.g., the data entries 207, 208, 209, 210, 211, and 212) store data and are not yet reserved to be read by a consumer. The number of data record entries that can be reserved and not yet committed by a producer is limited by the number of bits in the put map 260. As shown in FIG. 2, three empty data record entries can be reserved even if the reserved data record entry 206 remains uncommitted. In one embodiment, when a put request is received from a producer to reserve a data record entry and the put reserve pointer 230 cannot be advanced, the put request fails and the producer may resubmit the request at a later time. A put request may fail because either the put reserve pointer 230 should not advance outside of the put window 250 or the put reserve pointer 230 should not advance to point to the same entry as the get commit pointer 245.

The put reserve pointer 230 is advanced by one data record entry when each put reserve request is successfully processed. When the put commit pointer 235 is advanced following successful processing of a put commit request, the number of data record entries by which the put commit pointer is advanced is based on the put map 260. In other words, the put commit pointer 235 is advanced to point to the next uncommitted data record entry. For example, when the reserved data record entry 206 is committed, the put commit pointer 235 is advanced by two data record entries to point to the next uncommitted data record entry 204.

A get window 255 is defined by the get commit pointer 245 and a get map 265. The get map 265 includes a predetermined number of bits, where each bit corresponds to one data record entry. As shown in FIG. 2, the get map 265 is 8 bits and is therefore configured to represent the reserved/committed state of up to 8 data record entries. In other embodiments, the get map 265 may include fewer or more bits. The get map 265 indicates the status of the data record entries starting at the get commit pointer 245. For data record entries up to the get reserve pointer 240, each bit of the get map 265 indicates whether the corresponding data record entry is committed or not. When each data record entry is reserved by one or more consumers in-order, all of the data record entries between the get commit pointer 245 (inclusive) and the get reserve pointer 240 (exclusive) are reserved. The data record entries between the put commit pointer 235 (exclusive) and the get reserve pointer 240 (inclusive) (e.g., the data entries 207, 208, 209, 210, 211, and 212) store data and are not yet reserved to be read by a consumer.

The bits of the get map 265 that correspond to the data record entries 215, 217, 218, and 219 that are committed and are empty are set to zero. Note, that in some embodiments, the data which was stored and read may remain in the data record entry, but the data record entry is considered to be empty because the data record entry may be reused. The bits of the get map 265 that correspond to the data record entries 213, 214, 216, and 220 that are reserved and not yet committed, such that the data record entries 213, 214, 216, and 220 may still be read by a consumer, are set to one. In another embodiment, bits of the get map 265 for the data record entries that are committed are set to one and bits of the get map 265 for the data record entries that are not yet committed are set to zero.

The number of data record entries that can be reserved and not yet committed by a consumer is limited by the number of bits in the get map 265. As shown in FIG. 2, the data record 212 cannot be reserved until the reserved data record entry 220 is committed. In one embodiment, when a get request is received from a consumer to reserve a data record entry and the get reserve pointer 240 cannot be advanced, the get request fails and the consumer may resubmit the request at a later time. A get request may fail because either the get reserve pointer 240 should not advance outside of the get window 255 or the get reserve pointer 240 should not advance to point beyond the put commit pointer 235.

The get reserve pointer 240 is advanced by one data record entry when each get reserve request is successfully processed. When the get commit pointer 245 is advanced following successful processing of a get commit request, the number of data record entries by which the get commit pointer is advanced is based on the get map 265. In other words, the get commit pointer 245 is advanced to the next uncommitted data record entry. For example, when the data record entry 220 is committed, the get commit pointer 245 is advanced by four data record entries to point to the next uncommitted data record entry 216.

The put and get requests that reserve or commit an entry in the two-phase queue 200 may be decoupled from the write and read operations. The put and get reserve requests effectively allocate entries of the queue to producers and consumers, respectively, so that the data may be inserted into the two-phase queue 200 and then removed from the two-phase queue 200 at a later time. The put and get reserve requests may be pipelined along with put and get commit requests. In one embodiment, one or more producers may write data to a data record entry that has been reserved. When writing to the data record entry is complete, one of the producers may commit the data record entry by generating a put commit request. Similarly, in one embodiment, one or more consumers may read data from a data record entry that has been reserved. When reading from the data record entry is complete, one of the consumers may commit the data record entry by generating a get commit request. In another embodiment, multiple producers reserve and write data to multiple data record entries, so that each producer reserves and writes a different data record entry. Similarly, multiple consumers may reserve and read data from multiple data record entries, so that each consumer reserves and reads a different data record entry. The multiple producers may simultaneously write data to multiple data entries while one or more of the multiple consumers simultaneously read data from multiple data entries. The number of bits in the put map 260 and the get map 265 may be equal to or greater than the number of multiple producers or the number of multiple consumers.

State information for the two-phase queue 200 is stored in a queue state block. FIG. 3A illustrates a table 300 of the contents of a queue state block, in accordance with one embodiment. The queue state block may be stored in a memory, a cache, or in registers. The queue state block is accessed and updated when requests generated by the producers and consumers to reserve and commit data record entries are received by the two-phase queue 200.

The queue state block may include configuration flags (CFLAGS) and status flags (SFLAGS). The queue state block may also include a record size (RS) that specifies the size (in bytes, etc.) of a data record. In one embodiment, the data record entry in the two-phase queue may be a pointer to a data record that is stored outside of the data record entry, in which case a separate field in the queue state block may specify the size of the data record. The queue state block may also include a block capacity (BC) and a block address (BA). The block capacity may specify the length of the two-phase queue 200 in terms of the number of data record entries or the block capacity may specify the capacity of the block storage allocated to store the data records. The block address is the address of the block storage allocated to the two-phase queue 200.

A portion of the queue state block includes fields related to the put interface of the two-phase queue 200. A put reserve address (PR) is the address of the next data record entry to be reserved by a put reserve request (i.e., the address of the put reserve pointer 230). A put commit address (PC) is the address of the newest (in terms of being the furthest from the put reserved pointer 230) data record entry that has not yet been committed, in the put window 250. In one embodiment, the put reserve address and the put commit address may each be specified as an offset relative to the block address. The put map (PM) is a status map of the data record entries in the put window 250.

Another portion of the queue state block includes fields related to the get interface of the two-phase queue 200. A get reserve address (GR) is the address of the next data record entry to be reserved by a get reserve request (i.e., the address of the get reserve pointer 240). A get commit address (GC) is the address of the newest (in terms of being the furthest from the get reserved pointer 240) data record entry that has not yet been committed in the get window 255. In one embodiment, the get reserve address and the get commit address may each be specified as an offset relative to the block address. The get map (GM) is a status map of the data record entries in the get window 255.

In one embodiment, a portion of the queue state block also includes a field related to pending request handling so that a list of pending put requests and a list of pending get requests that have been deferred. As previously explained, a request may fail because the put reserve pointer 230 or the get reserve pointer 240 cannot be advanced. In one embodiment, a portion of memory or other storage is allocated to store pending requests and the two-phase queue 200 is configured to process requests from the pending request storage when the put reserve pointer 230 or the get reserve pointer 240 can be advanced. The pending put requests are processed in the order in which the put requests were received and new put requests should not bypass the pending put requests. Similarly, the pending get requests are processed in the order in which the get requests were received and new get requests should not bypass the pending get requests.

When the two-phase queue 200 is configured to handle pending requests instead of reporting a failure for requests that cannot be processed when the request is received, another portion of the queue state block includes fields related to the pending request handling. A pending state address (PS) is the address of the block storage allocated to store pending requests. A pending put state (PP) is a pointer to a data structure that stores the pending put requests and a pending get state (PG) is a pointer to a data structure that stores the pending get requests. In one embodiment, the pending put state and the pending get state may each be an offset relative to the pending state address. Handling pending requests instead of simply returning a fail response for requests that cannot be processed may improve the efficiency of accessing the two-phase queue 200 because producers and/or consumers do not need to "retry" requests that failed.

In one embodiment, the queue state block is 64 bytes in size with each field ranging in size from 1 byte to 8 bytes. For example, the SFLAGS field may be 1 byte and PM, GM, and PS fields may each be 8 bytes. The RS, BC, PR, PC, GR, and GC fields may each be 4 bytes, the CFLAGS field may be 3 bytes, and the PP and PG fields may each be 2 bytes. In other embodiments, one or more fields may be of different sizes and the size of the queue state block may be smaller than or greater than 64 bytes.

Figure 3B:
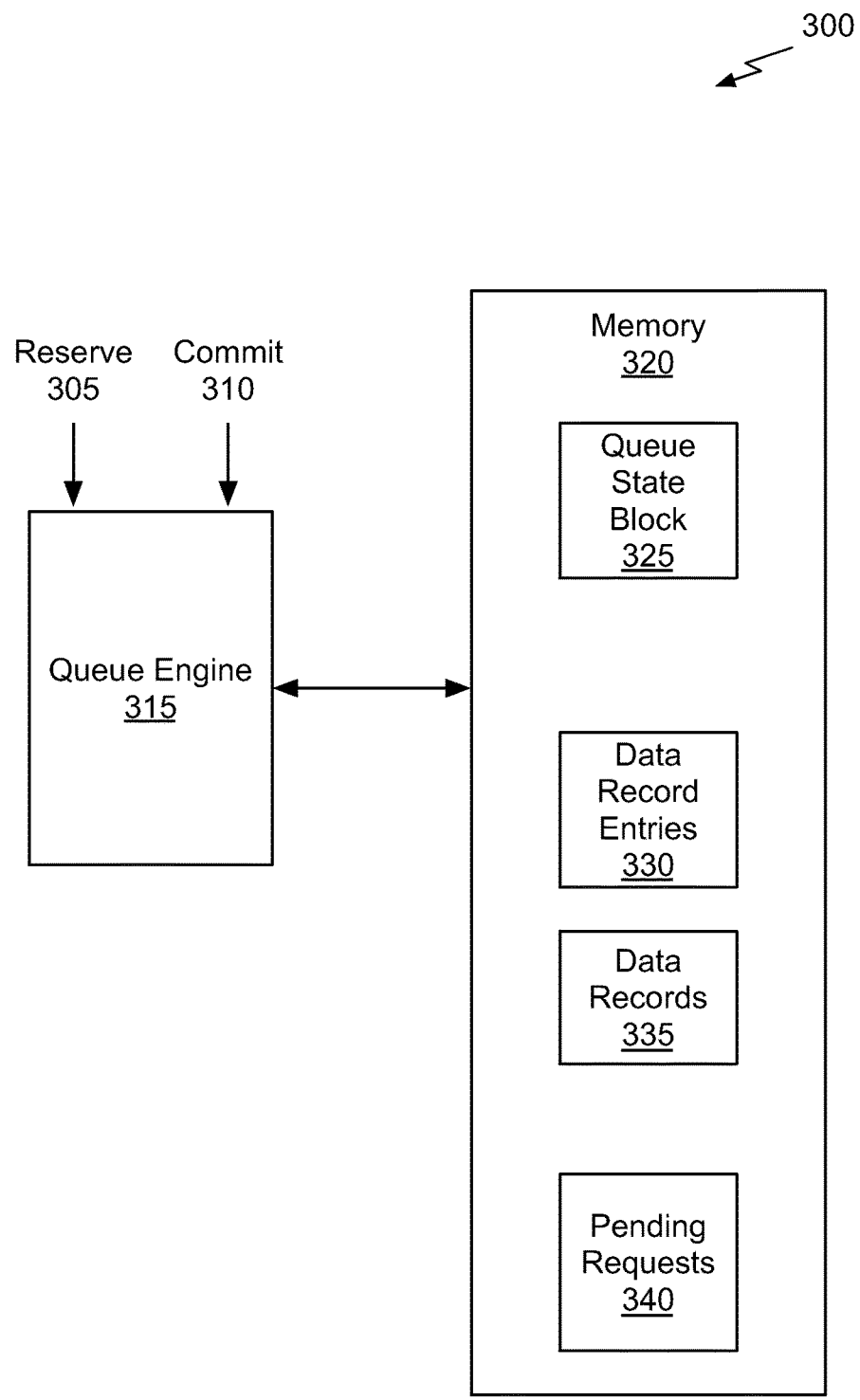
FIG. 3B illustrates a conceptual diagram of a queue engine and a memory, in accordance with one embodiment.

FIG. 3B illustrates a conceptual diagram 300 of a queue engine 315 and a memory 320, in accordance with one embodiment. The two-phase queue 200 includes a queue engine 315 that is configured to receive the reserve requests 305 and the commit requests 310 for put and get operations and generate responses to the requests. The memory 320 may be configured to store one or more of the two-phase queue components (e.g, a queue state block 325, data record entries 330, data records, and pending requests 340). In an embodiment of the two-phase queue 200 in which the data records are stored in the data record entries, the data records 335 may be included within the data record entries 330. Each of the queue state block 325, data record entries 330, data records 335, and pending requests 340 should be allocated as a block of linear memory (virtual or physical). The queue engine 315 accesses the queue state block 325 to process the requests. The producers and consumers may directly access the data records 335 that have been reserved.

In some embodiments, the queue state block 325 for a two-phase queue 200 is mapped into a local storage associated with one or more of the consumers and/or producers. In one embodiment, the queue state block 325 is mapped to the memory 320, but portions of the queue state block 325, such as the put and get interface fields are stored in dedicated registers. In another embodiment, the components of the two-phase queue 200 (e.g., the queue state block 325, the data record entries 330, the data records 335, and the pending requests 340) are memory-mapped onto an L2 cache memory or an L1 cache memory, which may be implemented as static random-access memory (SRAM) or main memory, which may be implemented as dynamic random-access memory (DRAM).

In the context of the present description, various operations may be performed to put data records into, get data records from, and otherwise manage, the two-phase queue 200. Direct queue operations may be exposed through an instruction set to allow software to transfer data records between registers and memory locations associated with one or more two-phase queues 200. Instructions that implement get and put requests may behave like load and store operations that target the address of the two-phase queue 200, with the addresses at which the load and store operations are performed determined from the queue state block 325. The instructions may be executed by a processor or the instructions may be invoked by sending messages to the two-phase queue 200.

An instruction corresponding to a put reserve request that attempts to reserve a data record entry at the tail of the two-phase queue 200 (i.e., the put reserve pointer 230) may use the following syntax:

Index=PutNext($Q$)

Where Q is the identifier of the particular two-phase queue 200. A predicate may be returned by the queue engine 315 when the PutNext instruction is processed to indicate whether the put reserve request succeeded or failed. As shown, in one embodiment, the queue engine 315 returns an index (or address) of the data record entry when the put reserve request succeeds. In one embodiment, the producer may then provide the index to a consumer of the data record after the producer commits the data record. The producer also specifies the index to commit the data record entry.

An instruction corresponding to a put reserve request that is configured to attempt and, if necessary, wait to reserve a data record entry at the tail of the two-phase queue 200 (i.e., the put reserve pointer 230) may use the following syntax:

Index=PutNextOrWait($Q$)

If, when the put reserve request is received the queue engine 315 can reserve a data record entry the queue engine 315 processes the put reserve request. Otherwise, the queue engine 315 inserts the instruction (or corresponding put reserve request) into a portion of the pending requests 340 that stores a queue of pending put requests. When the put reserve request can be processed, the queue engine 315 reserves a data record entry and returns the index (or address) of the data record entry to the requesting producer. A producer waiting for a data record entry to be reserved may stall until the put reserve request succeeds. When a thread that is executed by a processing unit is stalled, the thread may be swapped out so that the processing unit may execute a different thread that is not stalled. When the data record entry is reserved, the queue engine 315 may return the response (e.g., success identifier, index, or address) to a location in memory where the thread state of the stalled thread is maintained.

In some embodiments, an index or address may be provided as an operand for a put reserve instruction so that a particular data record entry may be reserved. An instruction corresponding to a put reserve request that attempts to reserve a data record entry associated with an index may use the following syntax:

Res=PutAt($Q$,Index)

Where Res is the location of the data record entry that is reserved. A predicate may be returned by the queue engine 315 when the PutAt instruction is processed to indicate whether the put reserve request succeeded or failed. When the data record entry specified by the index is outside of the put window 250, the queue engine 315 will indicate that the request failed. In one embodiment, the queue engine 315 returns a pointer to the reserved data record entry when the put reserve request succeeds. When a put request to reserve a data record entry that has already been reserved and is within the put window 250 is received, the queue engine 315 may be configured to indicate that the put request failed or may return an error code. In one embodiment, the queue engine 315 may initiate an interrupt and flag an error condition.

An instruction corresponding to a put reserve request that specifies a particular data record entry and is configured to wait, if necessary, to reserve the data record entry may use the following syntax:

Res=PutAtOrWait(Q)

If, when the put reserve request is received the queue engine 315 can reserve the specified data record entry, the queue engine 315 processes the put reserve request. Otherwise, the queue engine 315 inserts the instruction (or corresponding put reserve request) into a portion of the pending requests 340 that stores a queue of pending put requests. When the put reserve request can be processed, the queue engine 315 reserves the data record entry specified by the index and the queue engine 315 may return the response (e.g., success identifier, index, address, or pointer) to the requesting producer.

An instruction corresponding to a put commit request that attempts to commit a data record entry at the tail of the two-phase queue 200 (i.e., the put commit pointer 235) may use the following syntax:

Res=PutCommit(Q,Index)

When the put commit request can be processed, the queue engine 315 commits the data record entry specified by the index and the queue engine 315 may return a response (e.g., success identifier, index, address, or pointer) to the requesting producer. When a put request to commit a data record entry that is within the put window 250 has already been committed is received, the queue engine 315 may be configured to indicate that the put request failed or may return an error code. In one embodiment, the queue engine 315 may initiate an interrupt and flag an error condition.

An instruction corresponding to a get reserve request that attempts to reserve a data record entry at the head of the two-phase queue 200 (i.e., the get reserve pointer 240) may use the following syntax:

Index=GetNext(Q)

When the GetNext instruction is processed, the queue engine 315 may indicate whether the get reserve request succeeded or failed. As shown, in one embodiment, the queue engine 315 returns an index, address, or pointer to the data record entry when the get reserve request succeeds.

An instruction corresponding to a get reserve request that attempts to reserve a data record entry associated with an index may use the following syntax:

Res=GetAt(Q,Index)

When the GetAt instruction is processed, the queue engine 315 may indicate whether the get reserve request succeeded or failed. As shown, in one embodiment, the queue engine 315 returns an index, address, or pointer to the data record entry when the get reserve request succeeds. When the data record entry specified by the index is outside of the get window 255, the queue engine 315 will indicate that the request failed. When a get request to reserve a data record entry that is within the get window 255 has already been reserved is received, the queue engine 315 may be configured to indicate that the get request failed or may return an error code. In one embodiment, the queue engine 315 may initiate an interrupt and flag an error condition.

In one embodiment, a GetOrWait instruction may be provided that corresponds to a get reserve request that specifies a particular data record entry and is configured to wait, if necessary, to reserve the specified data record entry. If, when the get reserve request is received, the queue engine 315 can reserve the specified data record entry, the queue engine 315 processes the get reserve request. Otherwise, the queue engine 315 inserts the instruction (or corresponding get reserve request) into a portion of the pending requests 340 that stores a queue of pending get requests. When the get reserve request can be processed, the queue engine 315 reserve the data record entry specified by the index and the queue engine 315 may return the response (e.g., success identifier, index, address, or pointer) to the requesting consumer.

An instruction corresponding to a get commit request that attempts to commit a data record entry at the head of the two-phase queue 200 (i.e., the get commit pointer 245) may use the following syntax:

Res=GetCommit(Q,Index)

When the get commit request can be processed, the queue engine 315 commits the data record entry specified by the index and the queue engine 315 may return a response (e.g., success identifier, index, address, or pointer) to the requesting consumer. When a get request to commit a data record entry that is within the get window 255 has already been committed is received, the queue engine 315 may be configured to indicate that the get request failed or may return an error code. In one embodiment, the queue engine 315 may initiate an interrupt and flag an error condition.

Instructions may also be provided to perform compound operations, such as reserving, storing, and committing to a two-phase queue 200 to perform a store operation or reserving, reading, and committing from a two-phase queue 200 to perform a load operation. For example, a put instruction may be configured to execute a PutNext, PutAt, PutNextOrWait, or PutAtOrWait instruction, insert data specified by the put instruction into a data record of the two-phase queue 200, and then execute a PutCommit or PutCommitOrWait instruction. In one embodiment, a pointer to a location where the data is stored is inserted into the data record of the two-phase queue 200 instead of the data. Similarly, a get instruction may be configured to execute a GetNext, GetAt, GetNextOrWait, or GetAtOrWait instruction, read data specified by the get instruction from a data record of the two-phase queue 200, and then execute a GetCommit or GetCommitOrWait instruction. In one embodiment, a pointer to a location where the data is stored is read from the data record of the two-phase queue 200 instead of the data, and the data is read from the location specified by the pointer.

Figure 4A:
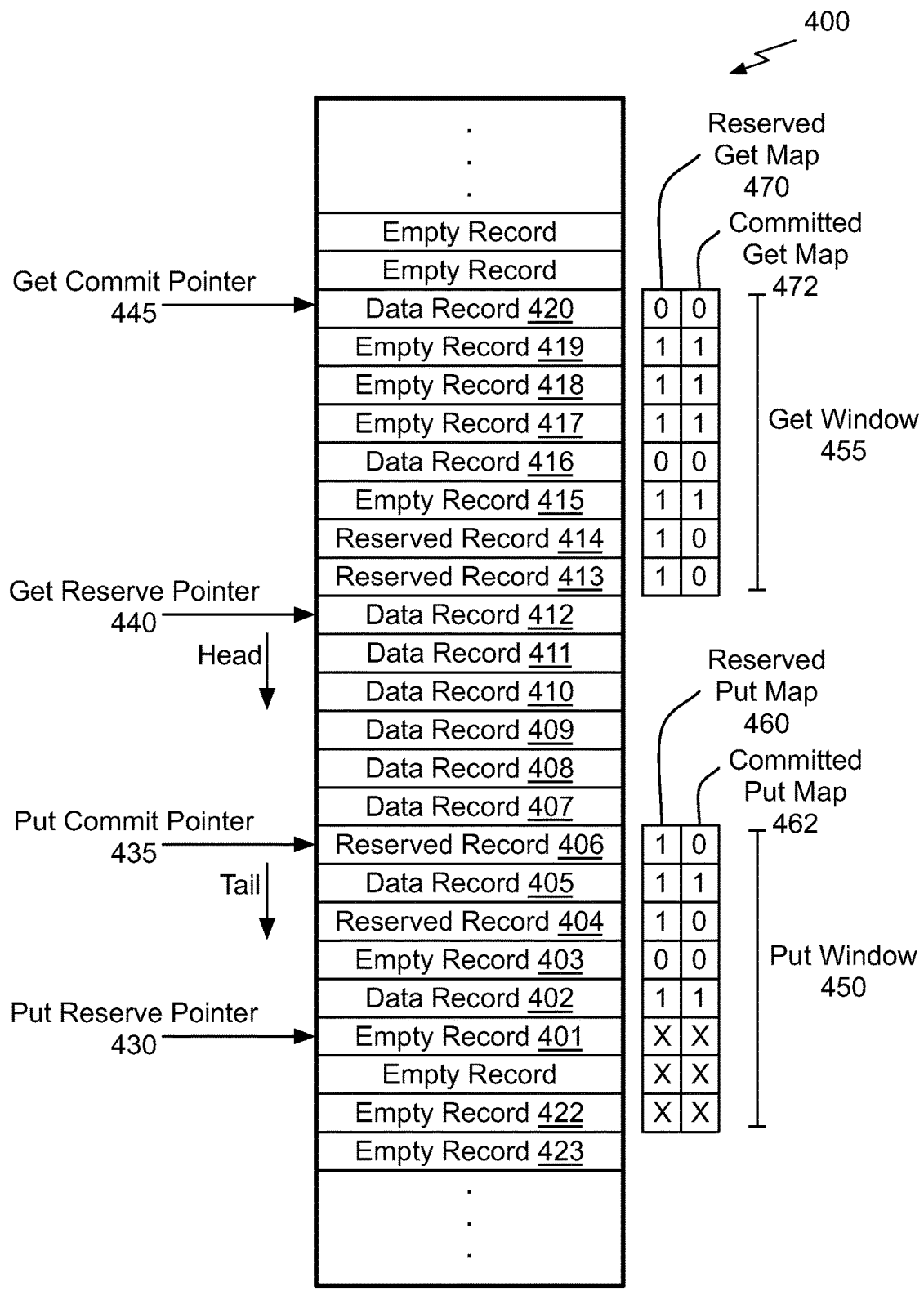
FIG. 4A illustrates another conceptual diagram of a queue, in accordance with another embodiment.

FIG. 4A illustrates another conceptual diagram of a two-phase queue 400, in accordance with another embodiment. Compared with the two-phase queue 200 shown in FIG. 2, the two-phase queue 400 includes four maps instead of two maps. The two-phase queue 400 is configured to support the execution of put and get reserve requests that specify indices or addresses corresponding to a specific data record entry as operands, such as the previously described PutAt, GetAt, PutAtOrWait, and GetAtOrWait instructions. The queue state block may be configured to include the additional maps for the two-phase queue 400.

As previously described in conjunction with FIG. 2, a set of put pointers including a put reserve pointer 430 and a put commit pointer 435 are used to reserve and commit data record entries when storing data into a tail of the two-phase queue 400. A set of get pointers including a get reserve pointer 440 and a get commit pointer 445 are used to reserve and commit data record entries when reading data from a head of the two-phase queue 400. As shown in FIG. 4A, a data record entry may be empty (e.g., empty record), may store data (e.g., data record), may be reserved for storing data (e.g., reserved record in the put window 450), may be reserved for reading data (e.g., reserved record in the get window 455).

However, in contrast with the embodiment shown in FIG. 2, the data record entries that are between the put reserve pointer 230 (exclusive) and the put commit pointer 235 (inclusive) have not necessarily all been reserved. A put window 450 is defined by the put commit pointer 435 and the put maps, reserved put map 460 and committed put map 462.

The put maps each include a predetermined number of bits, where each bit corresponds to one data record entry. As shown in FIG. 4, the reserved put map 460 and the committed put map 462 are each 8 bits and are therefore configured to represent the reserved state and the committed state, respectively, of up to 8 data record entries. In other embodiments, the put maps may include fewer or more bits. The put maps indicate the status of the data record entries starting at the put commit pointer 435. For data record entries up to the put reserve pointer 430, each bit of the reserved put map 460 indicates whether the corresponding data record entry is reserved or not and the committed put map 462 indicates whether the corresponding data record entry is committed or not. Because each data record entry may be reserved by one or more producers in any order, all of the data record entries between the put commit pointer 435 (inclusive) and the put reserve pointer 430 (exclusive) are not necessarily reserved.

Bits of the put maps corresponding to data record entries at and beyond the put reserve pointer 430 (the empty data record entry 401) are shown as don't cares (X's) because those data record entries are not yet reserved. The bits of the reserved put map 260 and the committed put map 262 that correspond to the data record entry 403 that is neither reserved nor committed, so that the entry is empty are set to zero. The bits of the reserved put map 460 and the committed put map 462 that correspond to the data record entries 402 and 405 that are reserved and committed, so that the entries store data are set to one. The bits of the reserved put map 460 that correspond to the data record entries 404 and 406 that are reserved and not yet committed, so the data record entries 404 and 406 do not yet store data, are set to one. The bits of the committed put map 462 that correspond to the data record entries 404 and 406 that are reserved and not yet committed, are set to zero. In another embodiment, bits of the committed put map 462 for the data record entries that are committed are set to zero and bits of the committed put map 462 for the data record entries that are not yet committed are set to one. Similarly, in another embodiment, bits of the reserved put map 460 for the data record entries that are reserved are set to zero and bits of the reserved put map 460 for the data record entries that are not yet reserved are set to one.

The put reserve pointer 430 may be advanced by one or more data record entries when each put reserve request is successfully processed. For example, when a put reserve request including an operand that specifies a particular data record entry, such as the empty data record entry 422 is successfully processed, the put reserve pointer 430 is advanced by three data record entries to point to the data record entry 423. If another put reserve request is then successfully processed that specifies the empty data record entry 403, the put reserve pointer 430 is not advanced because the data record entry 403 is between the put reserve pointer 430 and the put commit pointer 435. Therefore, the number of data record entries by which the put reserve pointer 430 may be advanced may be based on an operand included with a put reserve request that is successfully processed.

When the put commit pointer 435 is advanced following successful processing of a put commit request, the number of data record entries by which the put commit pointer 435 is advanced is based on the committed put map 462. In other words, the put commit pointer 435 is advanced to the next uncommitted data record entry. For example, when the reserved data record entry 406 is committed, the committed put map 462 is updated and the put commit pointer 435 is advanced by two data record entries to point to the next uncommitted data record entry 404.

The data record entries between the put commit pointer 435 (exclusive) and the get reserve pointer 440 (inclusive) (e.g., the data entries 407, 408, 409, 410, 411, and 412) store data and are not yet reserved to be read by a consumer. The number of data record entries that can be reserved and not yet committed by a producer is limited by the number of bits in the put maps. As shown in FIG. 4A, three empty data record entries can be reserved even if the reserved data record entry 406 remains uncommitted.

As previously described in conjunction with FIG. 2, a get window 455 is defined by the get commit pointer 445 and get maps. The get maps, reserved get map 470 and committed get map 472, each include a predetermined number of bits, where each bit corresponds to one data record entry. As shown in FIG. 4, the get maps are each 8 bits and are therefore configured to represent the reserved and committed state of up to 8 data record entries. In other embodiments, the get maps may include fewer or more bits. The get maps indicate the status of the data record entries starting at the get commit pointer 445. For data record entries up to the get reserve pointer 440, each bit of the reserved get map 470 indicates whether the corresponding data record entry is reserved or not and each bit of the committed get map 472 indicates whether the corresponding data record entry is committed or not. Because each data record entry is not necessarily reserved by one or more consumers in-order, the data record entries between the get commit pointer 445 (inclusive) and the get reserve pointer 440 (exclusive) may not all be reserved.

The bits of the reserved get map 470 and the committed get map 472 that correspond to the data record entries 415, 417, 418, and 419 that are committed and are empty are set to one. Note, that in some embodiments, the data which was stored and read may remain in the data record entry, but the data record entry is considered to be empty because the data record entry may be reused. The bits of the reserved get map 470 corresponding to the data record entries 413 and 414 that are reserved are set to one. However, the data record entries 413 and 414 are not yet committed, so the data record entries 413 and 414 may still be read by a consumer. Therefore, the bits of the committed get map 472 are set to zero. The data record entries 416 and 420 have been neither reserved nor committed. Therefore, the bits of the reserved get map 470 and the committed get map 472 corresponding to the data record entries 416 and 420 are set to zero. In another embodiment, bits of the reserved get map 470 for the data record entries that are reserved are set to zero and bits of the reserved get map 470 for the data record entries that are not yet reserved are set to one. Similarly, in another embodiment, bits of the committed get map 472 for the data record entries that are committed are set to zero and bits of the committed get map 472 for the data record entries that are not yet committed are set to one.

The number of data record entries that can be reserved and not yet committed by a consumer is limited by the number of bits in the get maps. As shown in FIG. 4, the data record 412 cannot be reserved until the data record entry 420 is reserved and committed. In one embodiment, when a get request is received from a consumer to reserve a data record entry and the get reserve pointer 440 cannot be advanced, the get request fails and the consumer may resubmit the request at a later time or the request may be added to a pending get request queue.

Similar to the put reserve pointer 430, the get reserve pointer 440 may be advanced by no data record entries or by one or more data record entries when each get reserve request is successfully processed. The number of data record entries by which the get reserve pointer 440 may be advanced may be based on an operand included with the get reserve request.

When the get commit pointer 445 is advanced following successful processing of a get commit request, the number of data record entries by which the get commit pointer 445 is advanced is based on the committed get map 472. In other words, the get commit pointer 445 is advanced to the next uncommitted data record entry. For example, when the reserved data record entry 420 is committed, the committed get map 472 is updated, and the get commit pointer 445 is advanced by four data record entries to point to the next uncommitted data record entry 416.

Figure 4B:
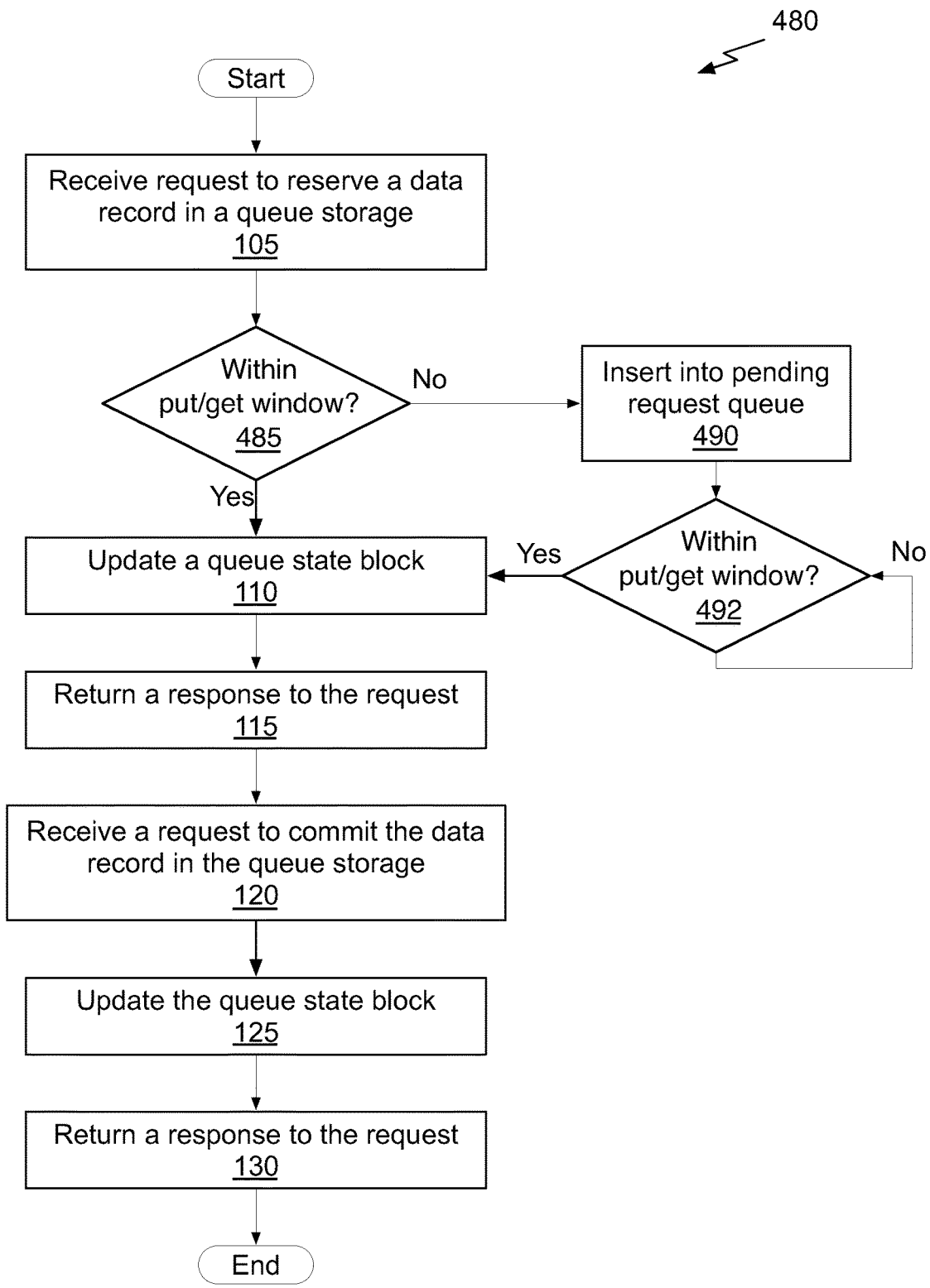
FIG. 4B illustrates a flowchart of another method for accessing a queue, in accordance with one embodiment.

FIG. 4B illustrates a flowchart of a method 480 for accessing a two-phase queue (e.g., the two-phase queue 200 or 400), in accordance with one embodiment. At operation 105, a first request to reserve a data record entry in a two-phase queue is received. The request may specify a particular data record entry to be reserved. The particular data record entry may be specified using an index.

At operation 485, the two phase queue determines if a data record entry (or the particular data record entry that was specified) is within the put window for a put reserve request and within the get window for a get reserve request, and, if so, at operation 110, the queue state block is updated based on the first request. When a data record entry is reserved the in the two-phase queue 200, the get reserve pointer 230 or the put reserve pointer 240 is advanced (i.e., incremented). When a data record entry is reserved in the two-phase queue 400, the get reserve pointer 440 or the put reserve pointer 430 is advanced unless the request specifies an index of a data record entry that is within the put or get window and behind the put reserve pointer 430 or the get reserve pointer 440, respectively. However, when a data record entry is reserved in the two-phase queue 400, the reserved put map 460 is updated for a put reserve request or the reserved get map 470 is updated for a get reserve request.

If, at operation 485, the two phase queue determines that a data record entry (or the particular data record entry that was specified) is not within the put window for a put reserve request and within the get window for a get reserve request, then at operation 490, the reserve request is inserted into a pending request queue. The two-phase queue repeats operation 492 until the reserve request in the pending request queue is within the put window for a put reserve request and within the get window for a get reserve request before proceeding to operation 110.

At operation 115, a response to the reserve request is returned. The response may indicate that the reserved request succeeded/or failed (if the data record entry was already reserved) and/or the response may include an index, address, or pointer corresponding to the reserved data record entry.

At operation 120, a second request to commit the data record entry in a two-phase queue is received. The request may specify a particular data record entry to be committed. The particular data record entry specified by the commit request is within the put window for a put commit request and within the get window for a get commit request. The particular data record entry should never be outside of the associated window because the data record entry being committed was previously reserved.

At operation 125, the queue state block is updated based on the commit request. When a data record entry is committed the in the two-phase queue 200, the get commit pointer 235 or the put commit pointer 245 is advanced (i.e., incremented). When a data record entry is reserved in the two-phase queue 400, the get commit pointer 435 or the put commit pointer 445 is advanced unless the request specifies an index of a data record entry that is within the put or get window and in front of the put commit pointer 235 or the get commit pointer 245, respectively. However, when a data record entry is committed in the two-phase queue 400, the committed put map 462 is updated for a put commit request or the committed get map 472 is updated for a get commit request.

At operation 130, a response to the commit request is returned. The response may indicate that the committed request succeeded and/or the response may include an index, address, or pointer corresponding to the committed data record entry.

Figure 5:
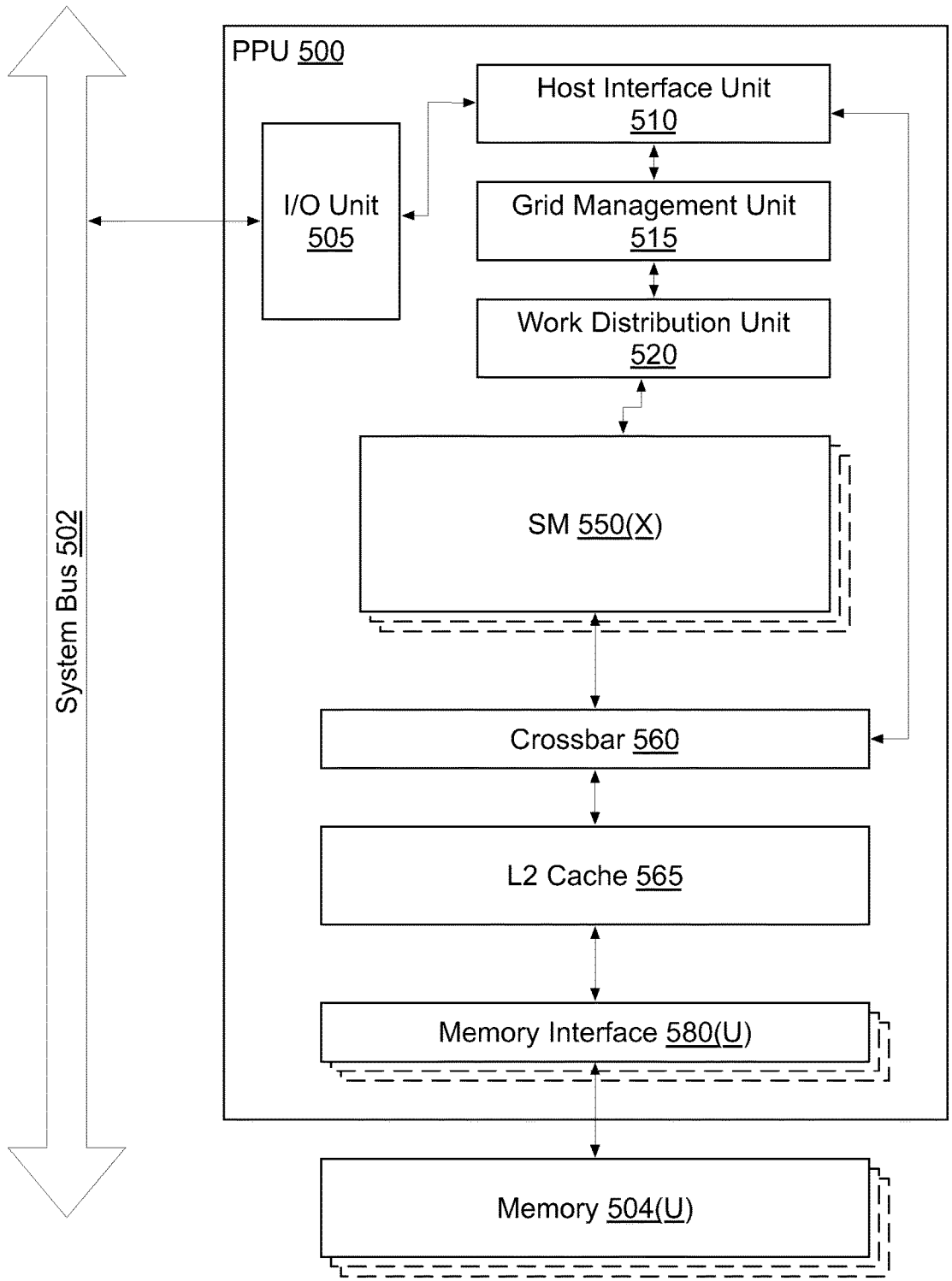
FIG. 5 illustrates a parallel processing unit (PPU), according to one embodiment.

FIG. 5 illustrates a parallel processing unit (PPU) 500, according to one embodiment. While a parallel processor is provided herein as an example of the PPU 500, it should be strongly noted that such processor is set forth for illustrative purposes only, and any processor may be employed to supplement and/or substitute for the same. In one embodiment, the PPU 500 is configured to execute a plurality of threads concurrently in two or more streaming multi-processors (SMs) 550. A thread (i.e., a thread of execution) is an instantiation of a set of instructions executing within a particular SM 550. Each SM 550, described below in more detail in conjunction with FIG. 6, may include, but is not limited to, one or more processing cores, one or more load/store units (LSUs), a level-one (L1) cache, shared memory, and the like.

The number of bits in the put and get maps of the two-phase queues 200 and 400 may be set to equal the number of threads that may be executed in parallel by an SM 550. A two-phase queue 200 or 400 may be shared by the threads executing in a single SM 550 or a separate two-phase queue 200 or 400 may be provided for each thread executing in an SM 550. When a shader program is executed by an SM 550, the shader program may be a producer that inserts data into the two-phase queue 200 or 400. The data may be read from the two-phase queue 200 or 400 by a consumer that is another shader program or the same shader program executed by the same SM 550 or a different SM 550. In another example, a fixed function processing unit (not shown) that is included within the PPU 500 may be either a producer or a consumer that accesses the two-phase queue 200 or 400 to either consume data generated by the shader program or to generate data that is consumed by the shader program. A fixed function unit may be configured to perform rasterization, texture filtering, compression, compositing, or particular mathematical operations.

In general, the two-phase queue 200 or 400 provides a uniform mechanism for software (e.g., a shader program) to submit tasks to fixed-function processing units or programmable processing units (e.g., an SM 550). The generation of the data that is stored in the data record entries may be reordered relative to the order in which the data record entries are reserved and/or committed. More specifically, the two-phase queues 200 and 400 provide a put window that allows multiple producers to reserve data record entries in order and compute (and commit) data record entries in compute order, and a get window that allow multiple consumers to process data record entries in same order in which the producers reserved the data record entries.

The length of the two-phase queues 200 and 400 (the number of data record entries in the two-phase queues 200 and 400) can be adjusted to accommodate varying latency, allowing the two-phase queues 200 and 400 to accommodate a flexible architecture having producer or consumer stages that may be programmable or fixed-function processing elements. The size of the put and get windows (the number of data record entries in each window) can also be adjusted to accommodate varying degrees of parallelism, i.e. varying numbers of producers and consumers.

In one embodiment, the PPU 500 includes an input/output (I/O) unit 505 configured to transmit and receive communications (i.e., commands, data, etc.) from a central processing unit (CPU) (not shown) over the system bus 502. The I/O unit 505 may implement a Peripheral Component Interconnect Express (PCIe) interface for communications over a PCIe bus. In alternative embodiments, the I/O unit 505 may implement other types of well-known bus interfaces.

The PPU 500 also includes a host interface unit 510 that decodes the commands and transmits the commands to the grid management unit 515 or other units of the PPU 500 (e.g., memory interface 580) as the commands may specify. The host interface unit 510 is configured to route communications between and among the various logical units of the PPU 500.

In one embodiment, a program encoded as a command stream is written to a buffer by the CPU. The buffer is a region in memory, e.g., memory 504 or system memory, that is accessible (i.e., read/write) by both the CPU and the PPU 500. The CPU writes the command stream to the buffer and then transmits a pointer to the start of the command stream to the PPU 500. The host interface unit 510 provides the grid management unit (GMU) 515 with pointers to one or more streams. The GMU 515 selects one or more streams and is configured to organize the selected streams as a pool of pending grids. The pool of pending grids may include new grids that have not yet been selected for execution and grids that have been partially executed and have been suspended.

A work distribution unit 520 that is coupled between the GMU 515 and the SMs 550 manages a pool of active grids, selecting and dispatching active grids for execution by the SMs 550. Pending grids are transferred to the active grid pool by the GMU 515 when a pending grid is eligible to execute, i.e., has no unresolved data dependencies. An active grid is transferred to the pending pool when execution of the active grid is blocked by a dependency. When execution of a grid is completed, the grid is removed from the active grid pool by the work distribution unit 520. In addition to receiving grids from the host interface unit 510 and the work distribution unit 520, the GMU 510 also receives grids that are dynamically generated by the SMs 550 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 500. An application may include instructions (i.e., API calls) that cause the driver kernel to generate one or more grids for execution. In one embodiment, the PPU 500 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 500 comprises X SMs 550(X). For example, the PPU 500 may include 15 distinct SMs 550. Each SM 550 is multi-threaded and configured to execute a plurality of threads (e.g., 32 threads) from a particular thread block concurrently. Each of the SMs 550 is connected to a level-two (L2) cache 565 via a crossbar 560 (or other type of interconnect network). The L2 cache 565 is connected to one or more memory interfaces 580. Memory interfaces 580 implement 16, 32, 64, 128-bit data buses, or the like, for high-speed data transfer. In one embodiment, the PPU 500 comprises U memory interfaces 580(U), where each memory interface 580(U) is connected to a corresponding memory device 504(U). For example, PPU 500 may be connected to up to 6 memory devices 504, such as graphics double-data-rate, version 5, synchronous dynamic random access memory (GDDR5 SDRAM).

In one embodiment, the PPU 500 implements a multi-level memory hierarchy. The memory 504 is located off-chip in SDRAM coupled to the PPU 500. Data from the memory 504 may be fetched and stored in the L2 cache 565, which is located on-chip and is shared between the various SMs 550. In one embodiment, each of the SMs 550 also implements an L1 cache. The L1 cache is private memory that is dedicated to a particular SM 550. Each of the L1 caches is coupled to the shared L2 cache 565. Data from the L2 cache 565 may be fetched and stored in each of the L1 caches for processing in the functional units of the SMs 550.

In one embodiment, the PPU 500 comprises a graphics processing unit (GPU). The PPU 500 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 500 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 515 may configure one or more SMs 550 to execute a vertex shader program that processes a number of vertices defined by the model data. In one embodiment, the GMU 515 may configure different SMs 550 to execute different shader programs concurrently. For example, a first subset of SMs 550 may be configured to execute a vertex shader program while a second subset of SMs 550 may be configured to execute a pixel shader program. The first subset of SMs 550 processes vertex data to produce processed vertex data and writes the processed vertex data to the L2 cache 565 and/or the memory 504. After the processed vertex data is rasterized (i.e., transformed from three-dimensional data into two-dimensional data in screen space) to produce fragment data, the second subset of SMs 550 executes a pixel shader to produce processed fragment data, which is then blended with other processed fragment data and written to the frame buffer in memory 504. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 500 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 500 is embodied on a single semiconductor substrate. In another embodiment, the PPU 500 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 500 may be included on a graphics card that includes one or more memory devices 504 such as GDDR5 SDRAM. The graphics card may be configured to interface with a PCIe slot on a motherboard of a desktop computer that includes, e.g., a northbridge chipset and a southbridge chipset. In yet another embodiment, the PPU 500 may be an integrated graphics processing unit (iGPU) included in the chipset (i.e., Northbridge) of the motherboard.

Figure 6:
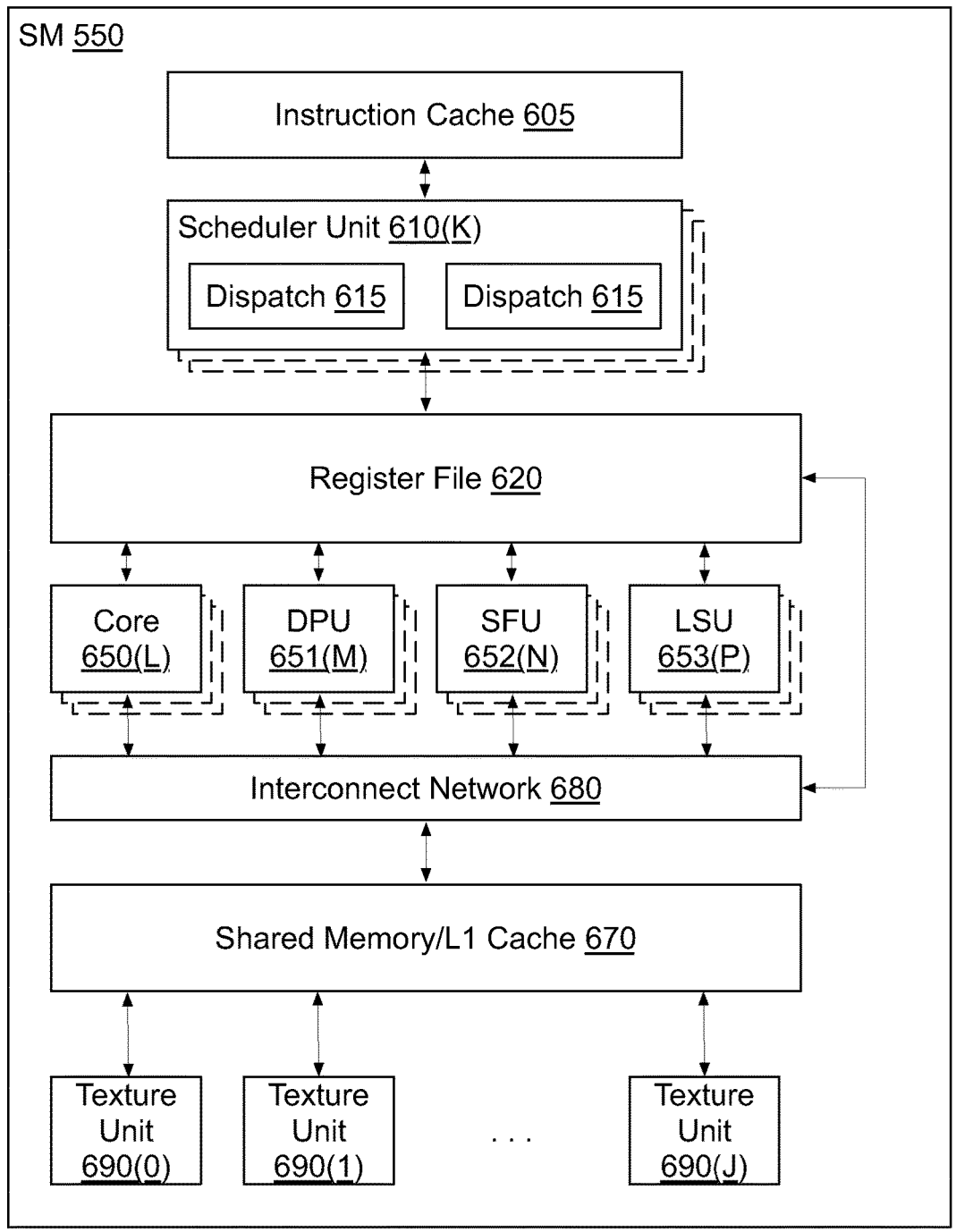
FIG. 6 illustrates the streaming multi-processor of FIG. 5, according to one embodiment.

FIG. 6 illustrates the streaming multi-processor 550 of FIG. 5, according to one embodiment. As shown in FIG. 6, the SM 550 includes an instruction cache 605, one or more scheduler units 610, a register file 620, one or more processing cores 650, one or more double precision units (DPUs) 651, one or more special function units (SFUs) 652, one or more load/store units (LSUs) 653, an interconnect network 680, a shared memory/L1 cache 670, and one or more texture units 690.

As described above, the work distribution unit 520 dispatches active grids for execution on one or more SMs 550 of the PPU 500. The scheduler unit 610 receives the grids from the work distribution unit 520 and manages instruction scheduling for one or more thread blocks of each active grid. The scheduler unit 610 schedules threads for execution in groups of parallel threads, where each group is called a warp. In one embodiment, each warp includes 32 threads. The scheduler unit 610 may manage a plurality of different thread blocks, allocating the thread blocks to warps for execution and then scheduling instructions from the plurality of different warps on the various functional units (i.e., cores 650, DPUs 651, SFUs 652, and LSUs 653) during each clock cycle.

In one embodiment, each scheduler unit 610 includes one or more instruction dispatch units 615. Each dispatch unit 615 is configured to transmit instructions to one or more of the functional units. In the embodiment shown in FIG. 6, the scheduler unit 610 includes two dispatch units 615 that enable two different instructions from the same warp to be dispatched during each clock cycle. In alternative embodiments, each scheduler unit 610 may include a single dispatch unit 615 or additional dispatch units 615.

Each SM 550 includes a register file 620 that provides a set of registers for the functional units of the SM 550. In one embodiment, the register file 620 is divided between each of the functional units such that each functional unit is allocated a dedicated portion of the register file 620. In another embodiment, the register file 620 is divided between the different warps being executed by the SM 550. The register file 620 provides temporary storage for operands connected to the data paths of the functional units.

Each SM 550 comprises L processing cores 650. In one embodiment, the SM 550 includes a large number (e.g., 192, etc.) of distinct processing cores 650. Each core 650 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 550 also comprises M DPUs 651 that implement double-precision floating point arithmetic, N SFUs 652 that perform special functions (e.g., copy rectangle, pixel blending operations, and the like), and P LSUs 653 that implement load and store operations between the shared memory/L1 cache 670 and the register file 620. In one embodiment, the SM 550 includes 64 DPUs 651, 32 SFUs 652, and 32 LSUs 653.

Each SM 550 includes an interconnect network 680 that connects each of the functional units to the register file 620 and the shared memory/L1 cache 670. In one embodiment, the interconnect network 680 is a crossbar that can be configured to connect any of the functional units to any of the registers in the register file 620 or the memory locations in shared memory/L1 cache 670.

In one embodiment, the SM 550 is implemented within a GPU. In such an embodiment, the SM 550 comprises J texture units 690. The texture units 690 are configured to load texture maps (i.e., a 2D array of texels) from the memory 504 and sample the texture maps to produce sampled texture values for use in shader programs. The texture units 690 implement texture operations such as anti-aliasing operations using mip-maps (i.e., texture maps of varying levels of detail). In one embodiment, the SM 550 includes 16 texture units 690.

The PPU 500 described above may be configured to perform highly parallel computations much faster than conventional CPUs. Parallel computing has advantages in graphics processing, data compression, biometrics, stream processing algorithms, and the like.

Figure 7:
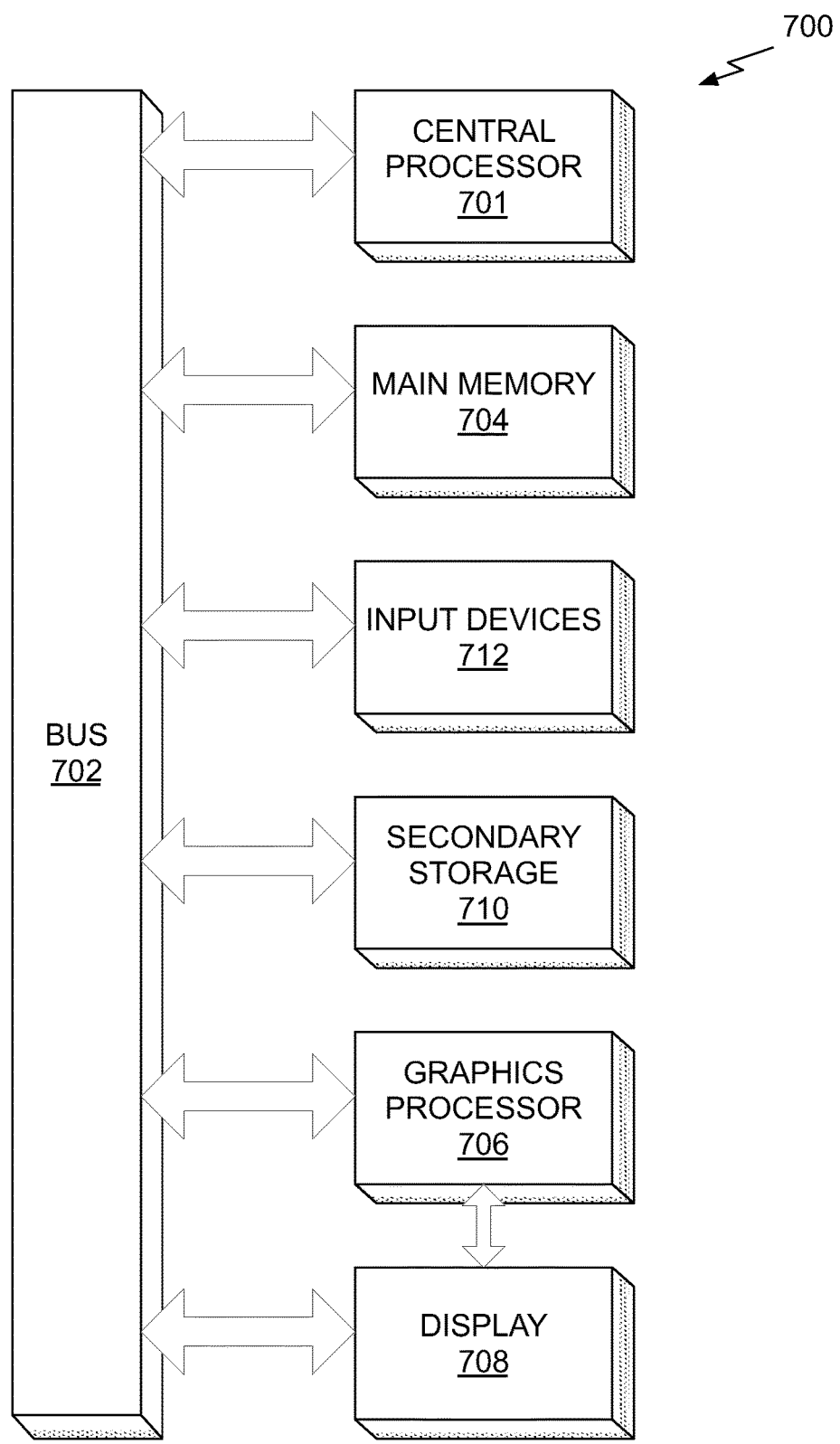
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. For example, a compiler program that is configured to examiner a shader program and enable or disable attribute buffer combining may be stored in the main memory 704. The compiler program may be executed by the central processor 701 or the graphics processor 706. The main memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, at a queue comprising a memory, a first request from a first processing unit to reserve a data record entry in the queue, wherein the data record entry is associated with a location in the memory that stores data written by a second processing unit;
   determining, based on a status map, that a reserve pointer can be advanced; updating the reserve pointer and the status map, wherein the status map indicates that the data record entry has not been read;
   returning, by the queue, a response to the first processing unit indicating that the data record entry was reserved;
   after returning the response, receiving a second request at the queue to read the data stored in the location in the memory; and
   determining that updating the reserve pointer will not cause the reserve pointer to equal a commit pointer that points to a second data record entry that is reserved to be written.

2. The method of claim 1, further comprising receiving a third request, wherein the third request is a put request and the second processing unit stores data in the location in the memory before the first request is received.

3. The method of claim 1, further comprising returning the data from the location in the memory to the first processing unit.

4. The method of claim 1, wherein a window in the queue is defined starting at a commit pointer and the window includes one or more data record entries between the commit pointer and the reserve pointer.

5. The method of claim 4, wherein the status map includes a bit for each data record entry within the window and the bit indicates a state of the data record entry.

6. The method of claim 1, wherein, the first request to reserve the data record entry includes an address of the data record entry.

7. The method of claim 1, further comprising,
   in response to receiving the second request:
   determining, based on the status map, that the data has not been read; updating the status map to indicate that the data has been read; and returning a response to the first processing unit.

8. The method of claim 7, further comprising:
   determining, based on the status map, that a commit pointer can be advanced;
   updating the commit pointer.

9. The method of claim 8, wherein the commit pointer is advanced by one or more data record entries to a next non-committed data record entry based on the status map.

10. The method of claim 1, further comprising, prior to determining that the reserve pointer can be advanced:
    determining that the reserve pointer cannot be advanced; and
    storing the first request in a pending queue until the reserve pointer can be advanced.

11. The method of claim 1, wherein the first request comprises an instruction that includes an operand indicating a number of data record entries by which the reserve pointer is advanced.

12. The method of claim 1, further comprising, prior to receiving the first request, storing the data in the memory associated with the data record entry.

13. The method of claim 1, further comprising:
receiving additional requests to reserve additional data record entries in the queue;
updating the status map based on the additional requests;
returning additional responses to the additional requests;
receiving additional second requests to commit the additional data record entries; and
updating the status map based on the additional second requests.

14. The method of claim 13, wherein the additional requests are received from multiple producers and the multiple producers simultaneously write data to the additional data entries, and the multiple producers are either multiple processing units or multiple fixed function units.

15. The method of claim 13, wherein the additional second requests are received from multiple consumers and the multiple consumers simultaneously read data from the additional second data entries, and the multiple consumers are either multiple processing units or multiple fixed function units.

16. A system comprising:
a memory configured to store one or more components of a queue; and a queue engine that is coupled to the memory and configured to:
receive a first request from a first processing unit to reserve a data record entry in the queue, wherein the data record entry is associated with a location in the memory that stores data written by a second processing unit;
determine, based on a status map, that a reserve pointer can be advanced; update the reserve pointer and the status map, wherein the status map indicates that the data record entry has not been read;
return a response to the first processing unit indicating that the data record entry was reserved;
after returning the response, receiving a second request at the queue to read the data stored in the location in the memory; and
determining that updating the reserve pointer will not cause the reserve pointer to equal a commit pointer that points to a second data record entry that is reserved to be written.

17. A non-transitory computer-readable storage medium storing instructions that, when executed by a processor, cause the processor to perform operations comprising:
receiving a first request from a first processing unit to reserve a data record entry in a queue, wherein a data record entry is associated with a location in the memory that stores data written by a second processing unit;
determining, based on a status map, that a reserve pointer can be advanced; updating the reserve pointer and the status map, wherein the status map indicates that the data record entry has not been read;
returning a response to the first processing unit indicating that the data record entry was reserved;
after returning the response, receiving a second request at the queue to read the data stored in the location in the memory; and
determining that updating the reserve pointer will not cause the reserve pointer to equal a commit pointer that points to a second data record entry that is reserved to be written.

18. The system of claim 16, wherein the queue engine is further configured to receive a put request and the second processing unit stores data in the location in the memory before the first request is received.

19. The system of claim 16, wherein, in response to receiving the second request, the queue engine is further configured to:
determine, based on the status map, that the data has not been read;
update the status map to indicate that the data has been read; and
return a response to the first processing unit.

20. The non-transitory computer-readable storage medium of claim 17, further comprising receiving a put request and the second processing unit stores data in the location in the before the first request is received.

21. The non-transitory computer-readable storage medium of claim 17, further comprising,
in response to receiving the second request:
determining, based on the status map, that the data has not been read; updating the status map to indicate that the data has been read; and returning a response to the first processing unit.

* * * * *

UNITED STATES PATENT AND TRADEMARK OFFICE
CERTIFICATE OF CORRECTION

PATENT NO. : 9,928,104 B2
APPLICATION NO. : 13/922189
DATED : March 27, 2018
INVENTOR(S) : William J. Dally et al.

Page 1 of 1

It is certified that error appears in the above-identified patent and that said Letters Patent is hereby corrected as shown below:

In the Claims

Column 20, Line 11 please replace "processing unit:" with --processing unit;--.

Signed and Sealed this
Third Day of March, 2020

Andrei Iancu
*Director of the United States Patent and Trademark Office*